Patented Sept. 8, 1953

2,651,636

UNITED STATES PATENT OFFICE 2,651,636

PREPARATION OF ORTHO-PHENANTHROLINE

Gordon K. Wheeler, Norwalk, Conn., assignor to R. T. Vanderbilt Company, Inc., New York, N. Y., a corporation of New York No Drawing. Application April 20, 1951, Serial No. 222,163

1 Claim. (Cl. 260—288)

My invention relates to a method for the preparation of ortho-phenanthroline.

The preparation of that compound by reacting ortho-phenylenediamine and glycerol was reported first by F. Blau in volume 19 of Monatshefte. The author stated that he obtained the desired compound in a yield of over 30%. In the volume cited, Blau did not give details with respect to the precise manner in which he prepared the ortho-phenanthroline, and subsequent workers have had difficulty in reacting ortho-phenylenediamine and glycerol in the presence of sulfuric acid and a dehydrogenating agent to yield consistently ortho-phenanthroline in amount of 30% by weight approximately, based upon the amount of ortho-phenylenediamine employed as a reactant. Note C. R. Smith, J. A. C. S., 52, 397–403 (1930); G. H. Walden et al., J. A. C. S., 55, 2650 (1933); and U. S. Patent No. 2,535,417 to E. Hodel et al.

I have discovered, however, that it is possible to prepare in high yield (35% to 40%) and with consistent results ortho-phenanthroline by the reaction of ortho-phenylenediamine and glycerol in the presence of sulfuric acid. The distinguishing features of my process are the use of arsenic trioxide as the dehydrogenating agent during the reaction between the ortho-phenylenediamine and the glycerol, and also the use of a solvent of a particular type in separating the desired compound from the salt and tar which are present in the reaction mixture after the reaction between the ortho-phenylenediamine and the glycerol has taken place.

Example

As a specific illustration 5.00 pounds of 66° Bé. sulfuric acid are placed in a jacketed reactor. One pound of ortho-phenylenediamine is then added slowly, while keeping the temperature of the mixture below 120° C. The temperature of the mixture is then raised to 130–135° C. and held there while arsenic trioxide in the amount of 2.60 pounds mixed with glycerol in the amount of 2.75 pounds is slowly added with thorough mixing. The temperature is then raised carefully until the reaction is initiated. When this happens, the heating is discontinued until the temperature, which may reach about 165° C., begins to drop. Heat is then applied to keep the temperature above 145° C. until the reaction is completed as determined by analysis. The mixture is then cooled and is diluted with an equal volume of hot water.

After the mixture has cooled to room temperature, it is filtered and the reaction precipitate is washed with water in the same amount as was previously used. The filtrate, including the water used for washing, is treated with an aqueous solution of caustic soda (33% by weight) until the pH is adjusted to 7.0. The neutralized reaction mixture is then evaporated to dryness. The residuum, containing ortho-phenanthroline, tar and sodium salts, is then extracted with hot kerosene (about 160° C.) which had previously been saturated with ortho-phenanthroline at room temperature. The solvent layer is thereafter decanted and is allowed to cool. Ortho-phenanthroline, ranging in amount 0.57 to 0.67 pound, thereupon separates in a highly purified form having a melting point of 116–118° C. The product is filtered off and the kerosene is then used over again in preparing the next batch. If desired, the ortho-phenanthroline can be further purified by recrystallization from boiling hot water to obtain the monohydrate.

In conducting the chemical reaction between the ortho-phenylenediamine and the glycerol to form the ortho-phenanthroline, the present process does not distinguish sharply from those heretofore employed, with the exception of the dehydrogenating agent. Thus, various modifications may be made in the specific procedure described in the example. In general, I prefer that the arsenic trioxide be present in the reaction mixture in amount ranging from 2 to 3 pounds approximately per pound of ortho-phenylenediamine. Further, neither the amount of glycerol nor the amount of concentrated sulfuric acid employed is critical, although I prefer to use from 2.5 to 3.0 pounds, approximately, of glycerol and, again approximately, 4.5 to 5.5 pounds of concentrated sulfuric acid per pound of ortho-phenylenediamine. In addition, the particular reaction temperature can be varied, temperatures within the vicinity of 120° C. to 165° C. being preferred.

After the reaction has been completed with the production of the desired compound, the reaction mixture is then cooled and water is added as a diluent. Here again, the amount of water added is not critical, although I prefer that it be within the range 0.5 to 2.0 times the volume of the reaction mixture, approximately.

Various basic materials can be used for the purpose of neutralizing the reaction mixture after it is filtered. Thus, in place of the sodium hydroxide used in the specific illustration there can be substituted ammonium hydroxide, an alkali metal hydroxide such as potassium hydroxide, or an alkaline earth metal hydroxide such as barium hydroxide.

After the reaction mixture has been dried, the ortho-phenanthroline is extracted therefrom by the use of a selective solvent. In the specific illustration, the solvent employed was kerosene, but in its place there can be substituted other hydrocarbon solvents having a saturated aliphatic content of 25–100% by weight, an aromatic content if not more than 80% by weight, and a naphthene content of not more than 25% by weight, for example, mineral spirits, mineral thinner, Stoddard solvent, white gasoline, isooctane, kerosene, Union Aromatic Solvent 40 (a proprietary solvent having a boiling range of 378–426° F. and composed of 22% paraffins, 13% naphthenes and 65% aromatics) and the like. Preferably, the solvent used is an essentially saturated one. The particular extraction procedure used with a given solvent will be apparent to those skilled in the art, the problem being one of forming selectively a concentrated solution of the ortho-phenanthroline in the solvent at a relatively high temperature and precipitating that ortho-phenanthroline from the solution by cooling, thus intentionally excluding all other products of the reaction and inorganic salts subsequently formed.

One of the difficulties encountered in preparing ortho-phenanthroline in a high state of purity and in good yield by reacting ortho-phenylenediamine and glycerol in the presence of sulfuric acid arises from the fact that, upon neutralization of the reaction mixture, the desired compound must be separated from the salts formed. I have found that this difficulty can be alleviated to a certain extent by first neutralizing the reaction mixture, after the reaction resulting in the formation of ortho-phenanthroline has been completed and after the water dilution and filtration step, to a pH of about 4.0 using an ion-exchange material which has the capacity for absorbing acids, such as an ion-exchange resin or a zeolite. The reaction mixture is then neutralized to a pH of about 7 using caustic soda or an equivalent material mentioned above, after which the procedure set forth in the specific example is followed. One particular ion-exchange resin which I have used is that known as Amberlite IR–4B, a polyamine type resin.

I claim:

In the preparation of ortho-phenanthroline by reacting ortho-phenylene diamine, glycerol, arsenic trioxide and sulfuric acid, the steps of recovering the ortho-phenanthroline from the salt and tar present in the neutralized reaction mixture by admixing the neutralized reaction mixture with hot kerosene thereby forming a solution of ortho-phenanthroline in hot kerosene and thereafter cooling the solution to precipitate the ortho-phenanthroline.

GORDON K. WHEELER.

References Cited in the file of this patent

Halcrow et al.: J. Chem. Soc. (London), 1946, pp. 155–157.

Chem. Abstracts, vol. 40, pp. 5729–5730 (1946).